(No Model.) 3 Sheets—Sheet 1.
R. EICKEMEYER.
ELECTRIC MOTOR.
No. 451,320. Patented Apr. 28, 1891.
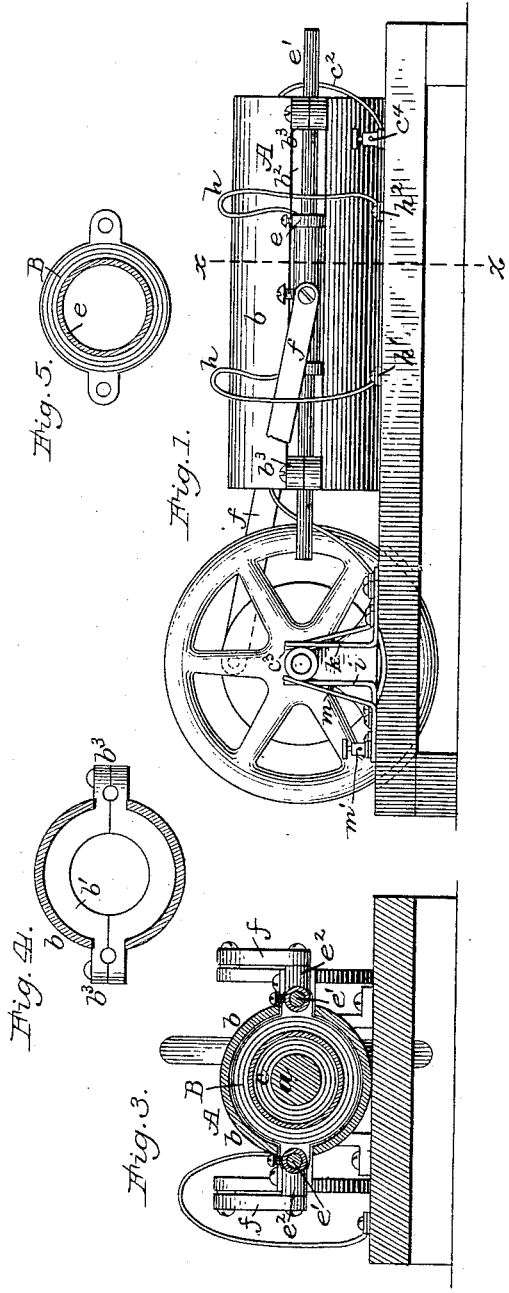
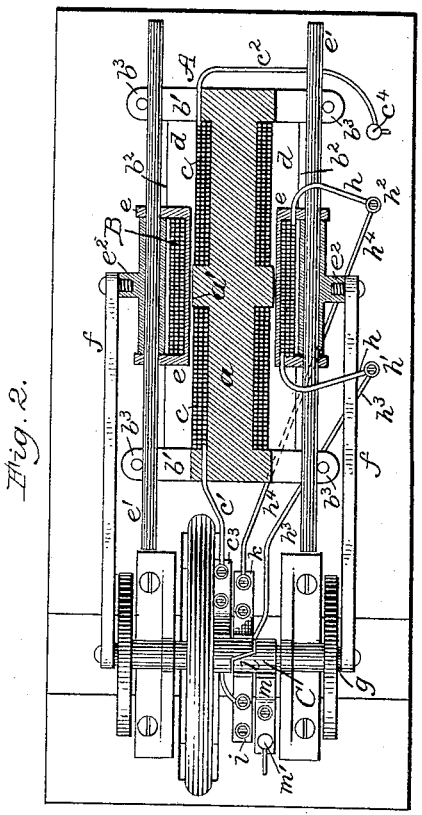
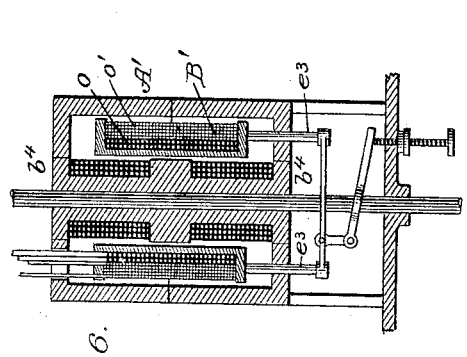
Attest:
Philip F. Larner
Nowell Barth
Inventor:
Rudolf Eickemeyer
By Wm. C. Wood
Attorney

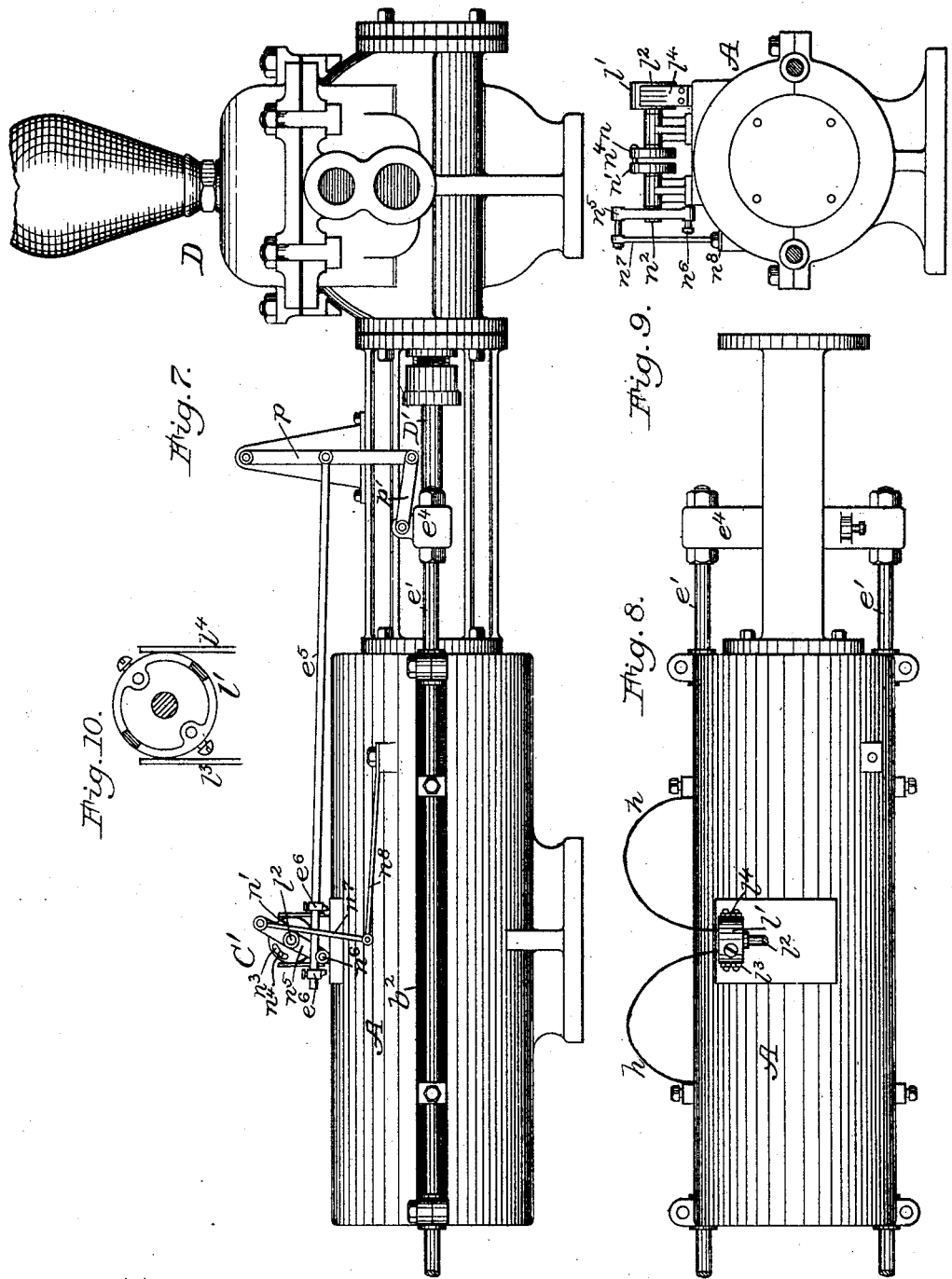

(No Model.) 3 Sheets—Sheet 3.
R. EICKEMEYER.
ELECTRIC MOTOR.
No. 451,320. Patented Apr. 28, 1891.
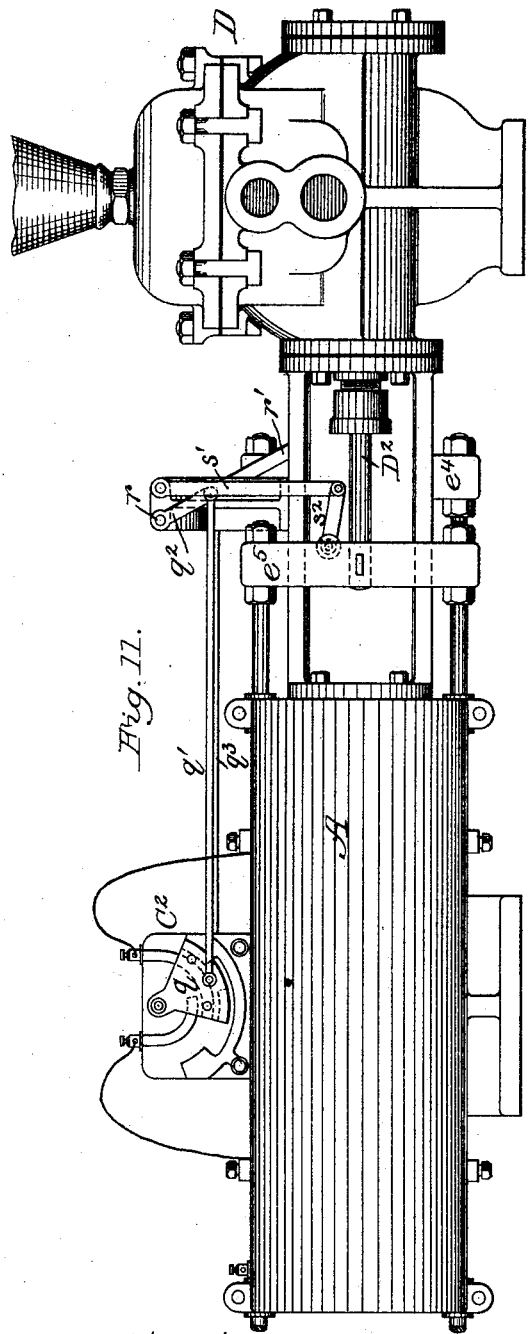
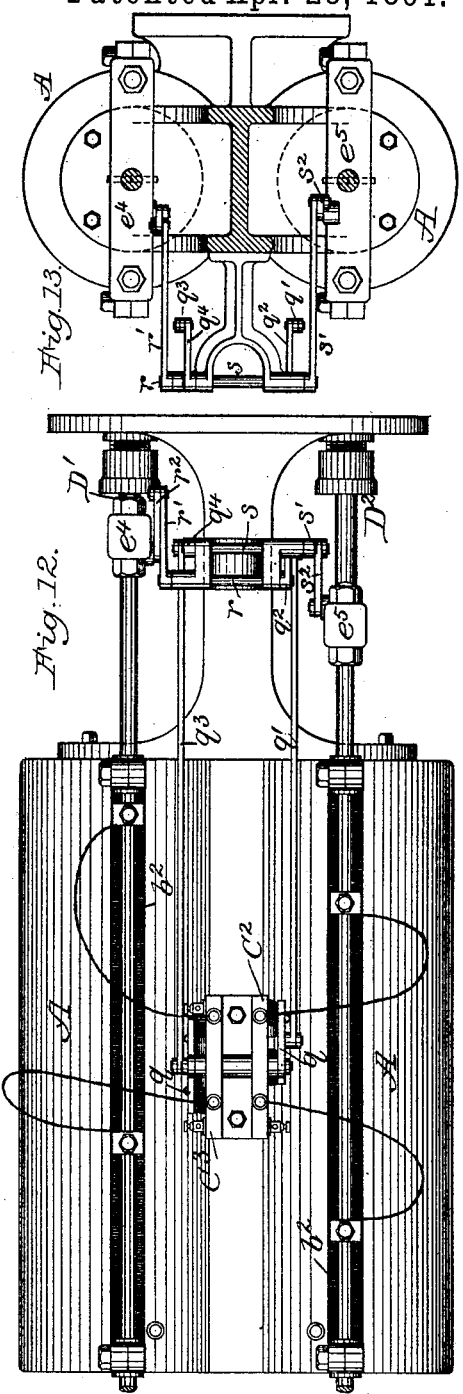
Attest:
Philip F. Larner
Howell Battle
Inventor:
Rudolf Eickemeyer
By J. M. Ward
Attorney.
THE NORRIS PETERS CO., PHOTO-LITHO., WASHINGTON, D. C.

UNITED STATES PATENT OFFICE.

RUDOLF EICKEMEYER, OF YONKERS, NEW YORK.

ELECTRIC MOTOR.

SPECIFICATION forming part of Letters Patent No. 451,320, dated April 28, 1891.

Application filed August 28, 1890. Serial No. 363,240. (No model.)

*To all whom it may concern:*

Be it known that I, RUDOLF EICKEMEYER, of Yonkers, in the county of Westchester and State of New York, have invented certain new and useful Improvements in Electric Motors; and I do hereby declare that the following specification, taken in connection with the drawings furnished and forming a part of the same, is a clear, true, and complete description of the several features of my invention.

My said improvements relate to what are termed "reciprocating electric motors," and motors embodying the main features of my invention may be so organized that the to-and-fro reciprocating movement may either be directly applied to duty or first converted into rotary motion.

In my Letters Patent No. 342,504, dated May 25, 1886, I showed and described a cup-shaped cored magnet and also a complex magnet embodying a combination of two such magnets, each having a central core of one polarity and a surrounding cylindrical shell of opposite polarity. This complex magnet develops little or no external magnetic field, its poles being located centrally between its two ends, the inner pole being at the junction of the cores and the outer pole being annular and at the junction of the ends of the cylindrical shells. I have now devised an electromagnet having similarly-arranged poles and specially adapted for use in reciprocating electric motors with a view to obtaining efficient service with a minimum expenditure of electrical energy, as compared with ordinary reciprocating electric motors. For use in this connection the magnet may be of the single core and shell form or embody two separate magnets, as before described, and united at their pole-faces; but I prefer that the entire core and the entire shell should be separately constructed and these two parts united, so that the heads of the shell and the two ends of the core will be connected in magnetic circuit, and also so that the cylindrical portion of the shell will complete the magnetic circuit between the two ends of the core, thus developing and locating an interior pole in the core midway of its ends and an outer pole in the corresponding annular portion of the shell. The exciting-helices or field-coils may be variously located and applied in my magnet without varying its magnetic efficiency, as will be apparent upon an examination of my said prior Letters Patent; but I prefer to locate said helices upon the core within the shell and at each side of the pole-face of the core, and to have said face occupy space between the inner ends of the helices, because I am thus enabled to reduce the length of the magnet to a minimum and afford required longitudinal and annular space for the reciprocating element. However the magnet may be varied in its construction, it should have between its two heads or ends and between the core and the interior surface of the shell space of ample dimensions to freely accommodate an armature-helix or solenoid and to enable a free longitudinal movement of either the entire magnet or the said helix to such an extent as may be necessary in each case. Said magnet should also be provided with one or more apertures or openings, preferably through such portions of the shell as are opposite said annular space, whereby proper communication will be afforded between the said reciprocating element and such external supporting devices and mechanical connections as may be requisite either for communicating motion from said helix, if that be reciprocated, or for firmly confining and supporting it in a fixed position if the magnet is reciprocated. Said apertures or openings may be located in one or both heads or ends of the magnet or in one or both sides of the cylindrical portion of the shell. When located in the ends of the magnet, said apertures can, whenever desirable, be made to serve as guide-bearings in connection with rods or other supporting and coupling devices which are connected with the reciprocating element, whether the latter be the armature-helix or the magnet. When located in the cylindrical portion of the shell, said apertures or openings are longitudinal slots, and these, with the helix-supporting devices, can be made to serve as guide-bearings for said helix or for the magnet, if it be the reciprocating element. However these helix supporting and coupling devices or the magnet may be varied in their construction and arrangement, the armature-helix must be maintained free from contact with the coincident surfaces of the core and shell, and as a rule its interior and exterior dimensions should be sufficient to nearly fill the annular space in the magnet; but its length must be so proportioned to the length of said space as to provide for the desired extent of reciprocating movement. With this magnet and the armature-helix I have organized suitable electric connections and circuit-changers, or what may be termed "automatically - operated switches," in various forms, according to the character of duty desired in each case, it being sometimes desirable to convert the reciprocatory into rotary motion, and sometimes to directly apply the reciprocating motion in the performance of duty. I have also coupled two motors together, so that they co-operate in the performance of duty and each actuates the circuit-changer of the other. I have also organized my magnet and helix so that the reciprocating movement will be varied as to its extent and time, according to variations in the energy or power of the actuating electric currents, instead of by their reversal, as when a circuit-changer is employed.

I have illustrated in the drawings several forms of motors, each embodying the main features of my improvements, and in some of them all of my said improvements are employed, and after describing the same the features deemed novel will be specified in the several clauses of claim hereunto annexed.

Referring to the drawings, Figure 1 illustrates my improvements as embodied in a reciprocating motor affording rotary motion, the same being partially in side elevation and partially in vertical section and with portions thereof broken away. Fig. 2 illustrates said motor partially in top view and partially in horizontal longitudinal section. Fig. 3 is a transverse vertical section of Fig. 1 on line $x$. Fig. 4 is a cross-section of the magnetic shell. Fig. 5 is a cross-section of the armature-helix and its supporting device. Fig. 6, in vertical central section, illustrates my magnet and helix organized as a motor for regulating an arc lamp. Fig. 7, in side elevation, illustrates one of my motors as applied to a pump, and with which the reciprocating movement is directly applied to duty. Fig. 8 is a top view of a portion of the motor detached from the pump and with the circuit-changing devices removed. Fig. 9 is an end view of the same with the circuit-changing devices in position. Fig. 10 is an enlarged side view of the circuit-changer detached. Fig. 11 is a side elevation of a co-operating pair of my motors applied to pumps and organized so that each motor operates the circuit - changer of the other. Fig. 12 is a top view of said motors. Fig. 13 is an end view thereof.

I will first describe the motor shown in Figs. 1 to 5, inclusive. The electro-magnet A has a core $a$ and a cylindrical shell $b$, and the ends of said core are snugly fitted to the ends or heads $b'$ of said shell. The central portion of the core has an annular straight pole-face $a'$, and on each side thereof the core is of a lesser diameter, and is occupied by the exciting-helices or field-coils $c$, which may have an external diameter equal to that of the core at its pole-face and at its ends. These exciting-helices are connected and have terminals $c'$ $c^2$, which are connected, respectively, with the base of a vertical spring-contact or brush $c^3$ and with a binding-post $c^4$, which serves as one of the electric terminals of the motor. The cylindrical shell $b$ has at each side a longitudinal slot $b^2$, opening into the annular space $d$, surrounding the core, and in this instance the shell is constructed in upper and lower parts united in line with said slots by means of bolts in ears $b^3$, which are made to serve as guide-bearings, although said slots may be relied upon for that purpose. The armature-helix B is in the form of a solenoid and encircles the core and freely occupies the annular space $d$, and is so proportioned in length to the interior length of the magnet as to afford the desired extent of reciprocating movement. The armature-helix B is provided with a suitable annular frame $e$, having wings at each side, which project laterally through the slots $b^2$, and it is provided with guide-rods $e'$, which occupy and slide in the guide-bearings at or in the shell-ears $b^3$, and said frame $e$ has also at its sides studs $e^2$, to which pitmen $f$ are coupled for connecting the armature-helix with cranks on a balance-wheel shaft $g$. The terminals $h$ $h$ of the armature-helix project through one of the slots $b^2$, and they are flexible and of sufficient length to admit of free movement by the helix, and their binding posts $h'$ $h^2$ are respectively coupled by wires $h^3$ $h^4$ to the vertical spring-contacts or brushes $i$ and $k$. The circuit-changer C is of a common form, and its split hub $l$ is mounted upon the shaft $g$ of the balance-wheel, so that it is properly engaged by the several necessary brushes. There are four of these brush-contacts $c^3$, $i$, and $k$, and the brush $m$, connected with a binding-post $m'$ and serving with the post $c^4$ as the electric terminals of the motor.

With the parts of the motor in the positions indicated in the drawings it will be seen that an electric current entering at the brush $m$ will pass by way of one half of the hub $l$ to the brush $i$, thence by conductor $h^3$ to the front end of the armature-helix, thence from its rear end by conductor $h^4$ to brush $k$, and from it to the other half of the hub $l$ to brush $c^3$, and thence through the exciting-helices on the magnet-core to and from the terminal post $c^4$, thereby inducing the movement of the armature-helix and rotation of the crank-shaft. When the hub is reversed in position by rotation, it will be seen that the entering current will then pass from the brush $m$ through one half of the hub $l$ to brush $k$, thence through conductor $h$ to the rear end of the armature-helix, thence from its front end by way of conductor $h^3$ to brush $i$ to and through the other half of the hub to brush $c^3$, and thence through the exciting-helices, as before described. The magnetic field being thus restricted to the interior of the magnet and to the annular space traversed by the helix, there is no material waste in magnetic energy or of such electric currents as are requisite for developing magnetism. The magnetic field being strongest at the middle of the annular space and gradually lessened each way therefrom, the dynamic energy of the armature-helix is greatest when the crank-pins are midway of their centers, and while said pins are approaching centers said helix is moving away from the strongest portion of the field into the weakest portion, and after said pins have passed their centers the helix moves toward and through the strongest portions of the field, all of which is conducive to ease in passing centers and hence of special value in reciprocating motors from which rotary motion is desired.

It is broadly new in a reciprocating electric motor to employ a magnet affording one annular outer pole and one interior pole at its core with an intervening annular field-space, whether the magnet or a helix freely occupying said space be the reciprocating element, and that feature constitutes one portion of my invention. It is also broadly new in an electric reciprocating motor to confine a magnetized core or bar of iron in a fixed position and to employ therewith a helix as the moving element, and this feature of my invention is wholly independent of the character of the magnet or core, and is of special value, because, however much the magnet may weigh, the helix and its frame may be properly proportioned to the magnet or core and be of much less weight and yet have proper strength for the reliable communication of power, and it is obvious that the lighter the moving element is the less will be the power required for overcoming its inertia preceding and following each interval of rest at the ends of the stroke.

It will be observed that although this machine embodies a double-cup magnet, or what is in substance two single co-operating cup, magnets, I do not restrict my invention to the double form, it being obvious that either end of the core and shell shown may be dispensed with as a portion of the electro-magnetic system without impairing the effectiveness of the remaining end or single magnet and its field-coil, if operated with the armature in like manner as if the double magnet were used.

The motor shown in Fig. 6 is organized as an arc-lamp regulator. The magnet $A'$ has an inclosing shell and a central core, with exciting-helices thereon, as before described; but the core is axially bored for the free reception of a lamp-carbon, and the apertures in the shell opposite the interior annular field-space are not in the cylindrical portions, but in the heads of the magnet at $b^4$, for the passage of rods $e^3$, which are the supporting and connecting devices of the armature-helix $B'$ and its frame, which occupies said annular field-space and moves vertically therein. These rods carry a cross-bar, to which is coupled the usual clamp-lever, which engages with the carbon candle in the usual manner. The armature-helix $B'$ in this instance is composed of an inner coarse-wire coil $o$ and an outer fine-wire coil $o'$; but a single coil may be employed if this differential arrangement be not desired. The armature helix or helices are connected in a well-known manner with the lighting-circuit, so that any increase of current in said circuit will cause the helix to rise and any decrease therein will cause it to descend, and thereby to regulate the arc. A dash-pot or other retarding device can be employed with the helix for securing proper steadiness in its movements.

The motor shown in Figs. 7 to 10, inclusive, like that of Fig. 6, has its reciprocating movement directly applied to duty; but in this instance the motor operates a piston-pump D. The magnet $A$ and the inclosed armature-helix are as before described; but the guide-rods $e'$ in this case are coupled together by a cross-head $e^4$, to which is connected the piston-rod $D'$ of the pump. The circuit-changer $C'$ is mounted upon the motor-magnet $A$, and is of a well-known form. (Fully indicated in Figs. 7, 9, and 10.) The contact-hub $l'$ is mounted at the outer end of a rock-shaft $l^2$, having at its inner end a disk $n$, and opposite the latter there is a second disk $n'$ on another rock-shaft $n^2$. These two disks are at times rotatively connected by means of a segmental or curved slot $n^3$ in the disk $n'$ and a stud $n^4$ on disk $n$, thus providing for a slight free movement of the disk $n'$ independently of the disk $n$. A lever or cross arm $n^5$ is secured to the outer end of the rock-shaft $n^2$, and its lower end has a projecting stud $n^6$. The upper end of this lever-arm $n^5$ is coupled by a link $n^7$ to the free end of a spring $n^8$, which is secured at its opposite end to the magnet. It will be seen that after positively moving the lever-arm $n^5$ in either direction to a vertical position toward its centers the spring $n^8$ will be strained, and that as soon as said lever-arm passes its center the spring will assert its power and with a quick impulse complete the rotative movement, thus promptly shifting the position of the circuit-changer. The lever $n^5$ is positively actuated by the movements of the cross-head $e^4$ by means of a reciprocating rod $e^5$, having thereon adjustable fingers or tappets $e^6$, which respectively engage with the stud $n^6$ on the lever-arm $n^5$, the opposite end of said rod being coupled to a pendent lever $p$, connected at its lower end by a link $p'$ with the cross-head $e^4$. The flexible electrical conductors $h\ h$ are the terminals of the armature-helix, as before described; but in this case they are directly connected with the contact-hub $l'$ at suitable screw sockets or posts, and the brushes $l^3\ l^4$ are properly connected with an electric generator or with a storage-battery. The electric connections for the exciting-helices of the magnet are not shown, it being understood that they may be included within a continuous separate circuit or within a circuit which includes a circuit-changer, as in Fig. 1.

In Figs. 11 to 13, inclusive, two of my motors are shown arranged side by side, and each operates one of the pistons in a duplex pump D. In these motors the magnets A A are as previously described, except that the slots $b^2$ are located in the upper and lower sides of the shell, thus arranging the cross-heads $e^4$ and $e^5$ in vertical positions. Each motor has its own circuit-changer $C^2 C^3$, these being of a well-known form, on an insulating-block and each embodying a swinging segmental conducting-arm $q$, carrying brushes which afford the requisite alternate electric connections, in a manner well known; but these circuit-changers are automatically actuated in a novel manner, in that the circuit-changer of either motor is not operated by the same motor, but by the other. The segmental swinging arm $q$ of the circuit-changer $C^2$ of one motor is coupled by a link $q'$ to an arm $q^2$ upon a rock-shaft $r$, which in turn is coupled by another arm $r'$ and a link $r^2$ to the cross-head $e^4$ of the other motor, this being connected with the pump piston-rod $D'$. The arm $q$ of the circuit-changer $C^3$ is coupled by a link $q^3$ to an arm $q^4$ upon another rock-shaft $s$, and this is in turn coupled by an arm $s'$ and a link $s^2$ to the other cross-head $e^5$, to which the pump piston-rod $D^2$ is connected. The flexible armature-helix conductors of each motor are as before described, and so, also, are the connections for the exciting field coils or helices. As thus organized it will be seen that each motor serves to positively operate the circuit-changer for the other, thus obviating the use of spring tripping devices, as when lost motion is necessarily involved, and enabling many simple forms of circuit changers or switches to be effectively employed.

In all of the motors shown the currents are changed only in the armature-helix; but the current in said helix may be constant, and the currents in the exciting-helices changed for inducing the reciprocation of the movable helix without departure from certain portions of my invention. So, also, may the so-called "armature-helix" be confined in position and the electro-magnet be movable, as when a hammering motion is desired, and in that case my invention would be involved, in that the magnet would wholly inclose said helix, whether the currents were changed in said helix or in the exciting-helices of the magnet.

Having thus described my invention, I claim as new and desire to secure by Letters Patent—

1. In the magnetic system of a reciprocating electric motor, the combination, substantially as hereinbefore described, of a cylindrical shell composed of magnetic metal, provided with apertures for receiving means for connecting an interior reciprocating element with external mechanism and affording at its inner surface an annular outer pole-face, a field coil or helix inclosed by said shell, and a central core of magnetic metal within said field-coil and affording at its outer surface an inner pole-face of opposite polarity to that of said outer pole-face.

2. In a reciprocating electric motor, the combination, substantially as hereinbefore described, of an electro-magnet embodying a central core and an inclosing magnetic shell, affording an annular magnetic field-space, and a longitudinally-reciprocating armature helix or solenoid provided with suitable guide-bearings.

3. In a reciprocating electric motor, the combination, substantially as hereinbefore described, of an electro-magnet embodying a central core and an inclosing magnetic shell, affording an annular magnetic field-space, and a longitudinally-reciprocating armature-helix or solenoid provided with suitable guide-bearings and means for alternately reversing the electric currents supplied thereto.

4. In a reciprocating electric motor, the combination, substantially as hereinbefore described, of an electro-magnet embodying a central core having a central annular pole-face and two exciting-helices, one at each side of said face, and an inclosing magnetic shell affording an annular field-space between it and said core, and a longitudinally-reciprocating armature-helix or solenoid provided with suitable guide-bearings and with means for alternately reversing the electric current supplied thereto.

5. In a duplex reciprocating electric motor, the combination, substantially as hereinbefore described, of two electro-magnets, each embodying a central magnetic core, appropriate field-coils, and an inclosing magnetic shell and circuit-changers for each motor, each changer operated by the reciprocating element in the other motor.

6. In a duplex reciprocating electric motor, the combination, substantially as hereinbefore described, of two electro-magnets, each having a central core, a field-coil, and a magnetic shell inclosing said core and coil, said core and shell affording between them an annular field-space, reciprocating solenoids in each of said shells occupying said annular spaces, and a circuit-changer for each solenoid operatively connected with and controlled by the reciprocating movements of the other solenoid.

RUDOLF EICKEMEYER.

Witnesses:
R. EICKEMEYER, Jr.,
J. IRVINE.